Feb. 2, 1971  R. C. FENWICK  3,560,982
VLF-LF AIRCRAFT TRAILING ANTENNA
Filed Oct. 1, 1968  4 Sheets-Sheet 1
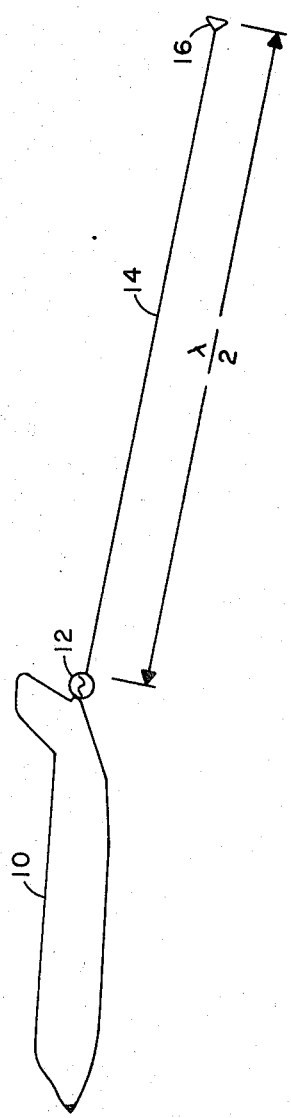
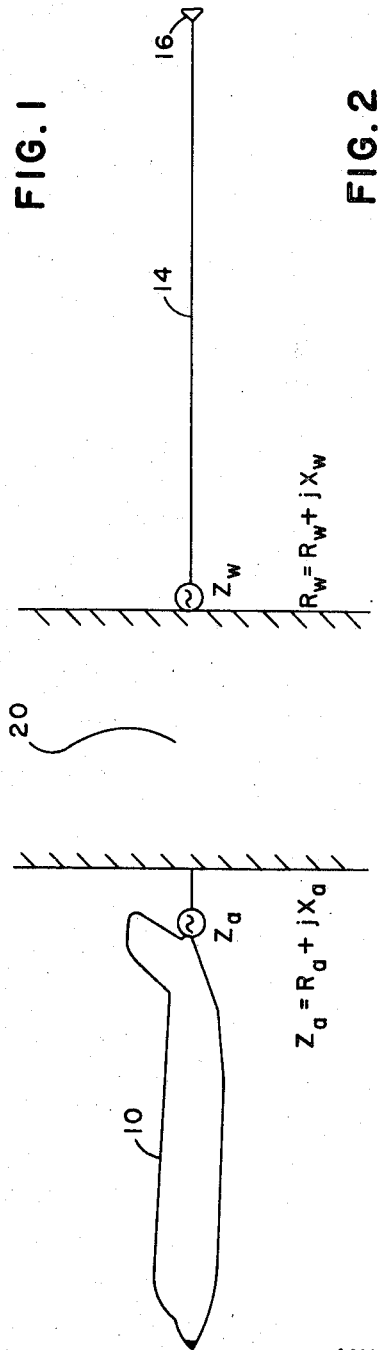
INVENTOR.
RICHARD C. FENWICK
BY *Henry K. Woodward*
ATTORNEY

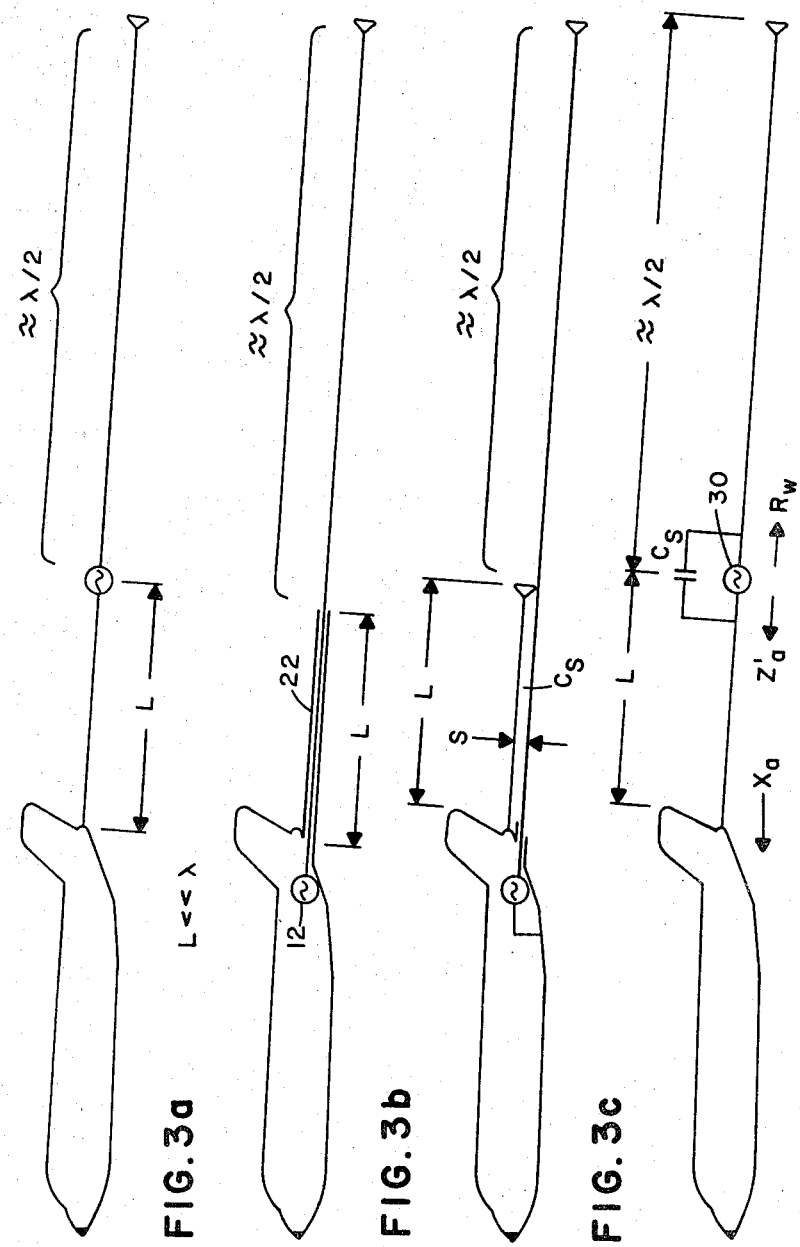

INVENTOR.
RICHARD C. FENWICK

BY Henry K. Woodward
ATTORNEY

United States Patent Office 3,560,982
Patented Feb. 2, 1971

3,560,982
VLF-LF AIRCRAFT TRAILING ANTENNA
Richard C. Fenwick, Richardson, Tex., assignor to Collins Radio Company, Dallas, Tex., a corporation of Iowa
Filed Oct. 1, 1968, Ser. No. 764,197
Int. Cl. H01q 1/30
U.S. Cl. 343—707
7 Claims

ABSTRACT OF THE DISCLOSURE

A VLF-LF aircraft antenna which can accommodate a high power transmitter including a first wire of approximately one-half the operating frequency wavelength in length and at least one other wire of approximately one-twentieth the operating frequency wavelength in length.

---

This invention relates in general to radio antennas, and more particularly to aircraft antennas operating in the VLF-LF radio frequency range.

In transmitting radio waves in the VLF and LF radio frequency ranges from an aircraft, it has been the practice to use a single trailing wire as an antenna with the antenna being fed against the aircraft. The length of the trailing wire is approximately one-half the operating frequency wavelength since the terminal voltage on the antenna during transmission of radio waves is minimized under such conditions, as is well known in the art. Since the VLF range begins at 10 kHz. which is a wavelength of 30,000 meters, it will be appreciated that the antenna is very much longer than the aircraft.

Unfortunately, the power capabilities of such a single wire antenna is limited because of the terminal voltage required for higher power levels. Input impedance and, hence terminal voltage, can be reduced by the use of a quarter wavelength stub for impedance matching, but such an arrangement is not particularly attractive due to the length of wire required for a quarter wavelength stub.

An object of this invention is an improved VLF-LF aircraft antenna.

Another object of the invention is an aircraft antenna which will accommodate a high power transmitter at VLF and LF frequencies.

A feature of the invention is the use of one or more relatively short wires in conjunction with a conventional VLF-LF aircraft antenna.

These and other objects and features of the invention will be apparent from the following description and appended claims.

Briefly, the present invention permits high power transmission at VLF and LF frequencies from an aircraft antenna by effectively increasing the size of the aircraft. This is accomplished by utilizing one or more relatively short (e.g. one-twentieth of the operating frequency wavelength or less) trailing wires cooperatively with the longer trailing antenna wire (approximately one-half the operating frequency wavelength). Advantageously, the shorter wire may be grounded to the aircraft with the longer wire being fed independently from the aircraft, or alternatively the shorter wire may be fed independently from the aircraft with the longer wire grounded to the aircraft. In still another embodiment both wires may be fed independently from the aircraft.

The invention will be more fully understood from the following detailed description and appended claims when taken with the drawing, in which:

FIG. 1 is a representation of an aircraft and a low frequency antenna;

FIG. 2 is an electrical schematic of the antenna and aircraft of FIG. 1;

FIGS. 3a–3d are schematics of an aircraft and antenna including means for improving the antenna electrical characteristics in accordance with the invention;

In all views, like elements have the same reference numerals.

Figure 4A:
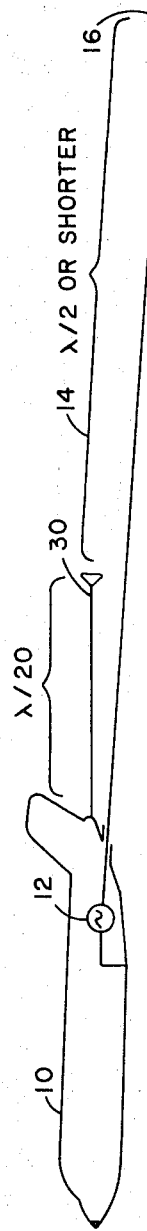
FIGS. 4a–4c are schematics of aircraft and antenna in accordance with the invention.

The present invention may be best understood by looking at the electrical characteristics of a VLF-LF aircraft antenna. With reference to the drawings, FIG. 1 s a representation of an aircraft 10 having a VLF radio generator 12 and a VLF antenna 14 extending from the aircraft with a drogue 16 affixed to the end of the antenna. As is conventional with such antenna, the length of antenna 14 is approximately one-half the radio frequency wavelength. At very low frequencies, the size of the aircraft is very small compared to the wavelength, e.g. $\frac{1}{100}$ or smaller. FIG. 2 is the electrical schematic of the aircraft 10 and antenna 14. The equivalent input impedance of the antenna, $Z_{in}$, is equal to the impedance of the aircraft, $Z_a$, fed against a ground plane 20 plus the impedance of the trailing wire, $Z_w$, fed against the ground plane 20 as follows:

$$Z_{in} = Z_a + Z_w$$
$$Z_{in} = R_a + jX_a + jX_w$$
$$= (R_a + R_w) + j(X_a + X_w)$$

Since the aircraft is very small compared to the operating frequency wavelength, $R_a$ is nearly zero, and since the trailing wire length will be equal to the resonant length, $X_w$ is zero. Thus, $$Z_{in} = R_w + jX_a$$

$R_w$ typically is the order of 3,000 ohms, and $X_a$ is equal $-\frac{1}{2\pi fC_a}$, where $f$ is the operating frequency and $C_a$ is the capacitance of the aircraft to the ground plane. Assuming an operating frequency of 17 kHz. and a capacitance $C_a$ of 1100 micromicrofarads, which is a typical number for a medium size transport aircraft, $X_a$ equals 8511 ohms.

The terminal voltage, V, is given in terms of power, P, as follows:

$$V = (P/R_{in})^{1/2} \cdot |Z_{in}| \quad (1)$$

where $|Z_{in}| \cong (R_w^2 + X_a^2)^{1/2} \cong 9100 \Omega$ at $f = 17$ kHz.

$$(2)$$

whence $V = 166 P^{1/2}$ at $f = 17$ kHz. $\quad (3)$

It is seen that $Z_{in}$ is primarily determined by $X_a$, which is a function of aircraft size. It is also seen that terminal voltage, V, can be quite large for the power levels normally required for communications at low frequencies. Assuming a power of one megawatt, which is comparable to the power of several ground stations presently in operation, a terminal voltage of 166 kilovolts is required. It is readily apparent that such voltages would be difficult to maintain between the antenna wire and the aircraft without flashover, particularly at high altitudes, and that wire diameter would have to be unacceptably large to prevent corona losses. Moreover, the components for the antenna matching network would be difficult and expensive to design and construct.

It will be noted from the above equations that the terminal voltage can be reduced for a given power level by reducing the reactance, $X_a$, of the aircraft. Consider now the equivalent circuits of an aircraft and antenna as illustrated in FIGS. 3a–3d. One method of reducing the aircraft reactance, $X_a$, other than by impedance stub matching, is by increasing the effective size of the aircraft. This could be accomplished by moving the radio transmitter 12 away from the aircraft 10 as illustrated in FIG. 3a. While this achieves the desired results, it is readily apparent that locating the transmitter outside the aircraft is impractical. FIG. 3b illustrates an alternative approach wherein a coaxial cable 22 is employed to feed the antenna from the generator 12 within the aircraft. Again, it is mechanically difficult to use a coaxial cable for the feedline. However, it is possible to replace the coaxial cable by a plurality of parallel wires which are grounded to the aircraft. In the limit, the outer conductor of the coaxial cable may be replaced by a single wire as illustrated in FIG. 3c. The equivalent circuit for this arrangement is illustrated in FIG. 3d where the generator 30 is effectively placed a length, L, from the aircraft.

FIG. 3d is an equivalent circuit for the antenna shown in FIG. 3c wherein the transmitter 30 is effectively displaced a length L from the aircraft with the capacitance between wires, $C_s$, shunting the transmitter. Again assuming that a resonant long wire is used, the input impedance for the antenna is now $Z_{in} = R_w + jX_a'$, where $X_a'$ is the effective impedance of the aircraft. The method of Schelkunoff, discussed in Schelkunoff and Fries, Antenna Theory and Practice, John Wiley & Sons, Inc., New York 1952, pages 425–426, may be used to calculate $X_a'$. Basically, the aircraft is treated as a load at the end of a transmission line of length L, radius $r$, and having a characteristic impedance $$Z_o = 60 \left[ \ln\left(\frac{2L}{r}\right) - 1 \right] \quad (4)$$

Conventional transmission line equations can then be employed to calculate the reactance $X_a$.

Figure 5:
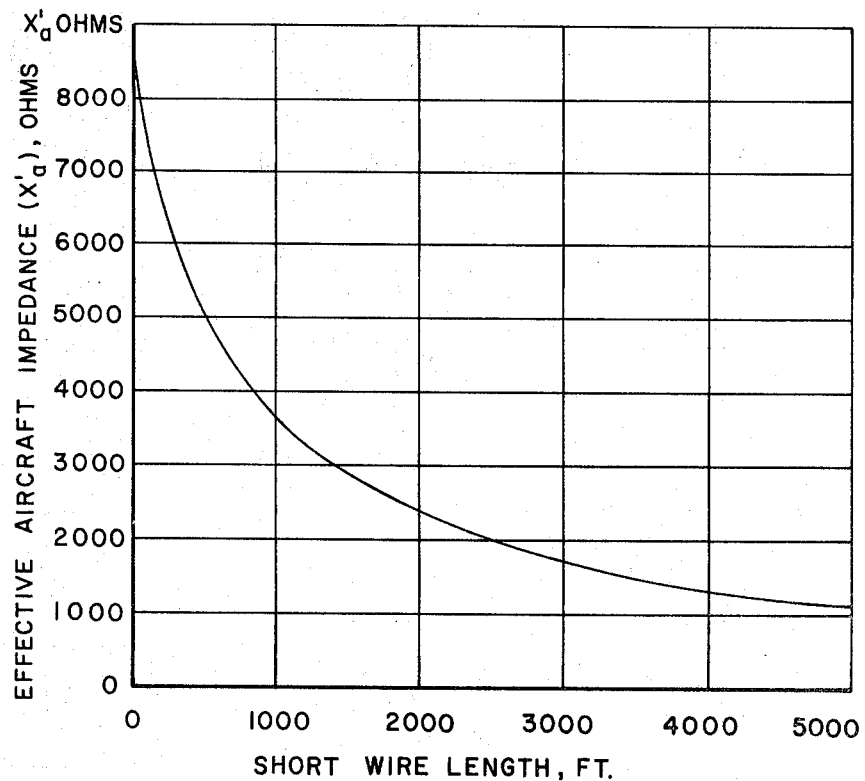
FIG. 5 is a plot of effective aircraft impedance using an antenna in accordance with the invention.

FIG. 5 shows calculated values of $X_a'$ versus length L of the short trailing wire where $r = .08$ inch and $X_a = -8511$ ohms and an operating frequency of 17 kHz. It is seen from Equation 2 that little is gained by reducing $X_a'$ or $X_a$ much below the value of the wire resistance $R_w$. Thus, from FIG. 5 a reasonable maximum length for L on the order of 2500 to 3000 feet for a frequency of 17 kHz., or about $\lambda/20$ regardless of the operating frequency.

In accordance with the present invention, the terminal voltage for a one megawatt transmitter as calculated from Equations 2 and 3 above, can be reduced from 166 kilovolts for a single half wavelength trailing wire to 65.8 kilovolts by using a second trailing wire having a length, L, of 2500 feet at an operating frequency of 17 kHz.

Figure 4B:
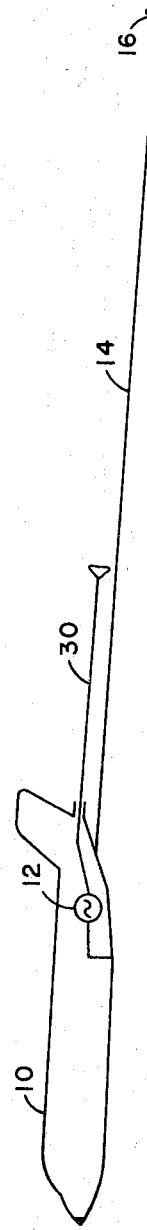
Figure 4C:
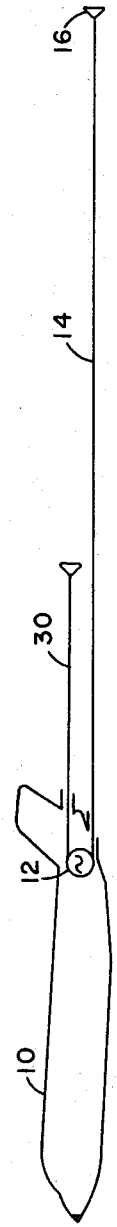

FIGS. 4a–4c are three illustrative embodiments of the antenna in accordance with the invention. In FIG. 4a, the long trailing wire 14 is fed from the generator 12 with the shorter trailing wire 30 being grounded to the plane. While this is the preferred mode of operation, it is also possible to feed the short wire 30 and ground the long wire 14 to the aircraft 10, as illustrated in FIG. 4b, or to feed the antenna independently from the aircraft as shown in FIG. 4c.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In combination with an aircraft, a radio transmitter comprising a radio wave generator, a first trailing wire of approximately one-half the radio wavelength in length, said first trailing wire being suspended by one end from said aircraft, at least one other trailing wire of substantially shorter length and suspended by one end from said aircraft, one trailing wire being electrically connected to the output of said radio wave generator, and one trailing wire being grounded to said aircraft.

2. A radio transmitter as defined by claim 1 where said at least one other trailing wire is on the order of one-twentieth the radio wavelength in length.

3. A radio transmitter as defined by claim 2 wherein said first trailing wire is grounded to said aircraft.

4. A radio transmitter as defined by claim 2 wherein said at least one other wire is grounded to said aircraft.

5. A VLF–LF aircraft antenna comprising a first wire of approximately one-half the radio wavelength in length, a second wire on the order of one-twentieth the radio wavelength in length, said first and second wire being suspended from an aircraft and electrically connected to a radio wave generator within said aircraft, and one of said wires being electrically connected to said airframe.

6. A VLF–LF aircraft antenna as defined in claim 5 wherein said second wire is electrically connected to said aircraft frame.

7. A VLF–LF aircraft antenna as defined in claim 5 and further including a third wire on the order one-twentieth the radio wavelength in length and suspended from said aircraft, said third wire and said second wire being electrically connected.

References Cited

UNITED STATES PATENTS

| 1,106,729 | 8/1914 | Rouzet | 343—877 |
| 1,418,729 | 6/1922 | Oswald | 343—707 |
| 2,593,427 | 4/1952 | Fill | 343—705 |

ELI LIEBERMAN, Primary Examiner

U.S. Cl. X.R.

343—843